United States Patent
Goldstein (10) Patent No.: US 10,234,285 B2
(45) Date of Patent: Mar. 19, 2019

(54) DEVICE AND METHOD FOR MULTIFUNCTION RELATIVE ALIGNMENT AND SENSING

(71) Applicant: The United States of America, as represented by the Secretary of the Navy, Washington, DC (US)

(72) Inventor: David J. Goldstein, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 156 days.

(21) Appl. No.: 15/262,351

(22) Filed: Sep. 12, 2016

(65) Prior Publication Data

US 2017/0004615 A1 Jan. 5, 2017

Related U.S. Application Data

(63) Continuation of application No. 14/059,175, filed on Oct. 21, 2013, now Pat. No. 9,513,119.

(60) Provisional application No. 61/794,040, filed on Mar. 15, 2013.

(51) Int. Cl.
| | |
|---|---|
| *G01C 11/02* | (2006.01) |
| *G01C 9/02* | (2006.01) |
| *G01C 11/06* | (2006.01) |
| *H04N 5/225* | (2006.01) |
| *G06T 7/70* | (2017.01) |
| *G01C 9/06* | (2006.01) |

(52) U.S. Cl.
CPC ............... *G01C 9/02* (2013.01); *G01C 11/06* (2013.01); *G06T 7/70* (2017.01); *H04N 5/2256* (2013.01); *G01C 2009/066* (2013.01)

(58) Field of Classification Search
CPC .......... H04N 5/2256; G01C 9/02; G06T 7/70
See application file for complete search history.

(56) References Cited

U.S. PATENT DOCUMENTS

| 5,153,916 A | * | 10/1992 | Inagaki | ............... G03F 7/70591 |
| | | | | 382/151 |
| 6,647,161 B1 | * | 11/2003 | Hodge | ..................... G02B 6/00 |
| | | | | 385/12 |

(Continued)

*Primary Examiner* — Jonathan R Messmore
(74) *Attorney, Agent, or Firm* — US Naval Research Laboratory; Suresh Koshy (57) ABSTRACT

A tiltmeter-integrated two element optical relative alignment monitor provides relative alignment and contact sensing and can provide precise information regarding the nature of physical contact experienced by objects being monitored. A computer monitor can display the information in real time, in an intuitive manner. This system can provide all the information with good resolution in a low-cost, easily installable package for a wide variety of research, high energy physics applications, and industrial uses. A projector unit is mounted on one component containing a diffuse light source, a coded mask, and a lens. The projector is aligned with a camera to receive the focused image. Shifts in the image of the mask indicate relative motion between the camera and the projector unit. A tiltmeter is affixed to either the camera or projector, to distinguish between image shifts due to translational movement and image shifts due to rotation or tilting.

4 Claims, 11 Drawing Sheets

(56) References Cited

U.S. PATENT DOCUMENTS

2005/0036036 A1* 2/2005 Stevenson ........ G08B 13/19608
348/211.99
2006/0190916 A1* 8/2006 Pike .................. H01L 21/67242
716/55

* cited by examiner

DEVICE AND METHOD FOR MULTIFUNCTION RELATIVE ALIGNMENT AND SENSING

CROSS-REFERENCE TO RELATED APPLICATIONS

This Application is a Continuation of application Ser. No. 14/059,175 filed on Oct. 21, 2013. Application Ser. No. 14/059,175 claims the benefit of U.S. Provisional Application 61/794,040 filed on Mar. 15, 2013. The entire disclosure of each document is incorporated herein by reference.

BACKGROUND

1. Technical Field

This is related to systems for real-time monitoring of position and alignment of components, such as in an engine or other machinery system.

2. Related Technology

Many industrial facilities and machines require knowledge of the precise relative location of different components. For example, particle accelerators and other systems used for high-energy physics research rely on knowledge of the precise relative positions of the many sensors, called tracking detectors, which sense the passage of charged particles generated by the high energy collider.

As an example, one of the components of Fermi National Accelerator Laboratory's Collider Detector at Fermilab (CDF) is a silicon detector, which includes seven concentric cylinders of silicon surrounding the beam pipe. Particles can pass through as many as all seven layers of silicon, leaving a trail of ions and electrons in each layer. This trail is recorded as a "hit" on that particular layer of silicon. By connecting the dots, scientists can determine the path of the particle. Because the silicon detector is located within a magnetic field, charged particles (such as electrons, muons, and charged hadrons) are forced to curve in their paths. The slower or less massive they are, the greater the magnet's effect on them, and the more they curve. The amount of curvature in the particle's track is used to determine the particle's mass and velocity, which provides valuable information about the particles that were produced immediately after a proton and antiproton collided. In these and other high energy physics experiments, precise track reconstruction is needed, so the location of each detector components must be known to high accuracy.

The original, or "three element," RASNIK (Relative Alignment System of NIKHEF) system was developed at NIKHEF (Dutch National Institute of Subatomic Physics) in the 1980s and early 1990s. This system provided low-cost, real-time relative alignment monitoring of detector components for experimental high-energy physics experiments. The potential of the three-element RASNIK was limited, however, by the number of required independent elements and requirements on their relative spacing.

Figure 1:
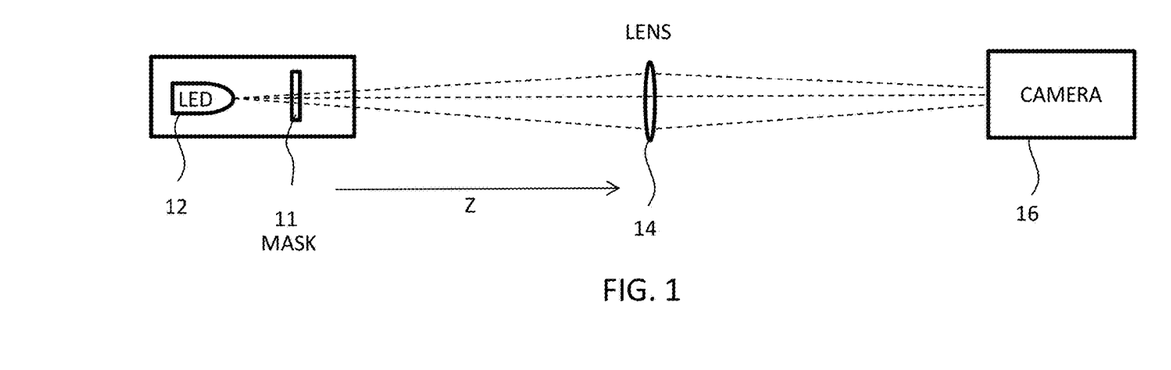
FIG. 1 shows a three-element relative alignment system monitoring system.

The three-element RASNIK system, shown in FIG. 1, includes three distinct elements. The first element is a diffuse light source 12 arranged to illuminate a coded mask 11. The coded mask 11 is a complex pattern imprinted on a thin substrate, such as quartz glass. The second element is a lens 14, which is mounted approximately midway between the projector 10 and the third element, a camera 16. The camera 16 could be, for example, a charge coupled device (CCD) grayscale micro-video camera. Each of the three elements is rigidly mounted to a physically independent object or structure. If any of the three elements moves, there is a corresponding movement of the projected image on the camera, allowing the system to track the relative alignment of the structures to which the elements are attached. The mask 11 can be a grid of black and white squares on the order of about 100 microns, photo-etched onto a thin quartz slide. Deviations from a perfect checkerboard grid are coded into the pattern to remove large scale ambiguities. The large number of black/white transitions in the pattern provides great statistical power for measuring relative movement.

SUMMARY

An aspect of the invention is a method for monitoring changes of relative position of a first object with respect to a second object. The method includes illuminating a coded mask with a diffuse light source, such that a pattern of the coded mask is projected through a lens to a camera positioned to receive a focused image of the mask from the lens, with the diffuse light source, the lens, and the coded mask being components of a projector unit affixed to the first object and the camera being affixed to the second object; measuring, with a tiltmeter, an amount of tilt of the projector or camera with respect to a reference line between the projector and the camera; and monitoring both the image of the coded mask and the amount of tilt of the projector or camera to determine changes in relative position of the first component with respect to the second component.

Another aspect is a method for monitoring motion of a moving structure with respect to a stationary structure, the method comprising: illuminating a coded mask with a diffuse light source, such that a pattern of the coded mask is projected through a lens to a camera positioned to receive a focused image of the mask from the lens, with the diffuse light source, the lens, and the coded mask being components of a projector unit rigidly mounted to a first component of the stationary structure and the camera being rigidly mounted to a second component of the stationary structure, and with a tiltmeter attached to either the camera or the projector unit; and moving the moving component with respect to the stationary structure while visually monitoring both a sequence of images of the mask from the camera and an amount of tilt measured by the tiltmeter.

Another aspect of the invention is a method for monitoring the relative position of a portion of a structure with respect to another portion of the structure, the method comprising: illuminating a coded mask with a diffuse light source, such that a pattern of the coded mask is projected through a lens to a camera positioned to receive a focused image of the mask from the lens, with the diffuse light source, the lens, and the coded mask being components of a projector unit rigidly mounted to the first portion of the structure and the camera being rigidly mounted to the second portion of the industrial machinery, and with a tiltmeter attached to either the camera or the projector unit; measuring, with a tiltmeter, an amount of tilt of the projector or camera with respect to a reference line between the projector and the camera; and monitoring the image of the coded mask on a display screen to determine changes in relative position of the first portion with respect to the second portion.

DETAILED DESCRIPTION OF THE INVENTION

The tiltmeter-integrated real time alignment, contact sensor, and monitoring system described herein has applications in many industrial fabrication/assembly processes which require very high-precision relative alignment. The relative alignment monitoring system described herein can provide not only relative alignment and contact sensing, but also precise information regarding the nature of physical contact experienced by the objects being monitored (e.g. loading, forced rotation, torsion). Further, this information can be displayed visually in real time, and in a manner which is intuitive to an untrained operator after working with the system for only a few minutes. This system can provide all the information with good resolution in a low-cost, easily installable package for industrial uses and high energy physics applications.

The tiltmeter-integrated real time alignment, contact sensor, and monitoring system can also provide a significant improvement in present methods for using RASNIK systems for monitoring alignment between components. For example, one challenge in interpreting RASNIK data is discerning between pure translations and rotations. Incorporating a tilt meter into one of the system elements provides a way to distinguish between these movements with single standalone system.

Figure 2:
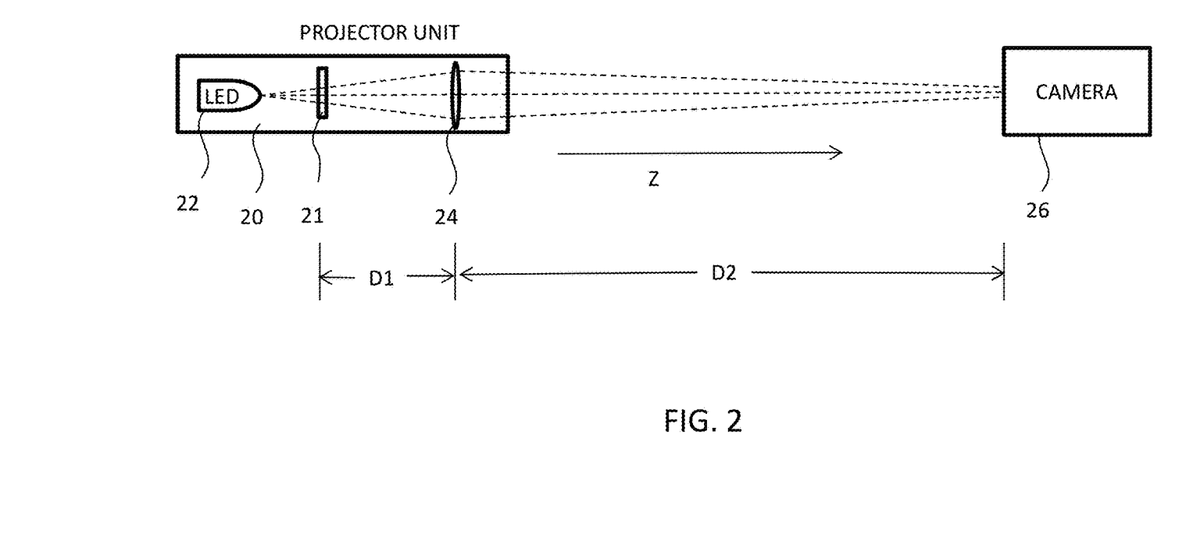
FIG. 2 illustrates a two-element RASNIK system.

D. Goldstein and D. Salzberg, "The RASNIK Real-Time Relative Alignment Monitor for the CDF Inner Tracking Detectors", Nuclear Instruments and Methods in Physics Research A, Vol. 506, pp. 92-100, (2003), which is incorporated by reference herein in its entirety, describes the conception and installation of a "two-element" RASNIK in the Collider Detector at Fermilab (CDF) experiment's silicon tracking detector. This two-element system eliminated much of the ambiguity inherent in the original RASNIK system data, and increased the number of potential usage scenarios. FIG. 2 illustrates a two-element RASNIK system, in which the light source 22, coded mask 21, and lens 24 are integrated into a single projector unit 20. The second element is the camera 26, which is mounted on a structure that is physically independent from the first structure. The asymmetry between the distance D1 between the mask and the lens and the distance D2 between the lens and the camera magnifies the mask pattern, so masks with smaller dimensions are suitable. For example, the smallest squares on the mask can be approximately 20 microns.

Figure 3A:
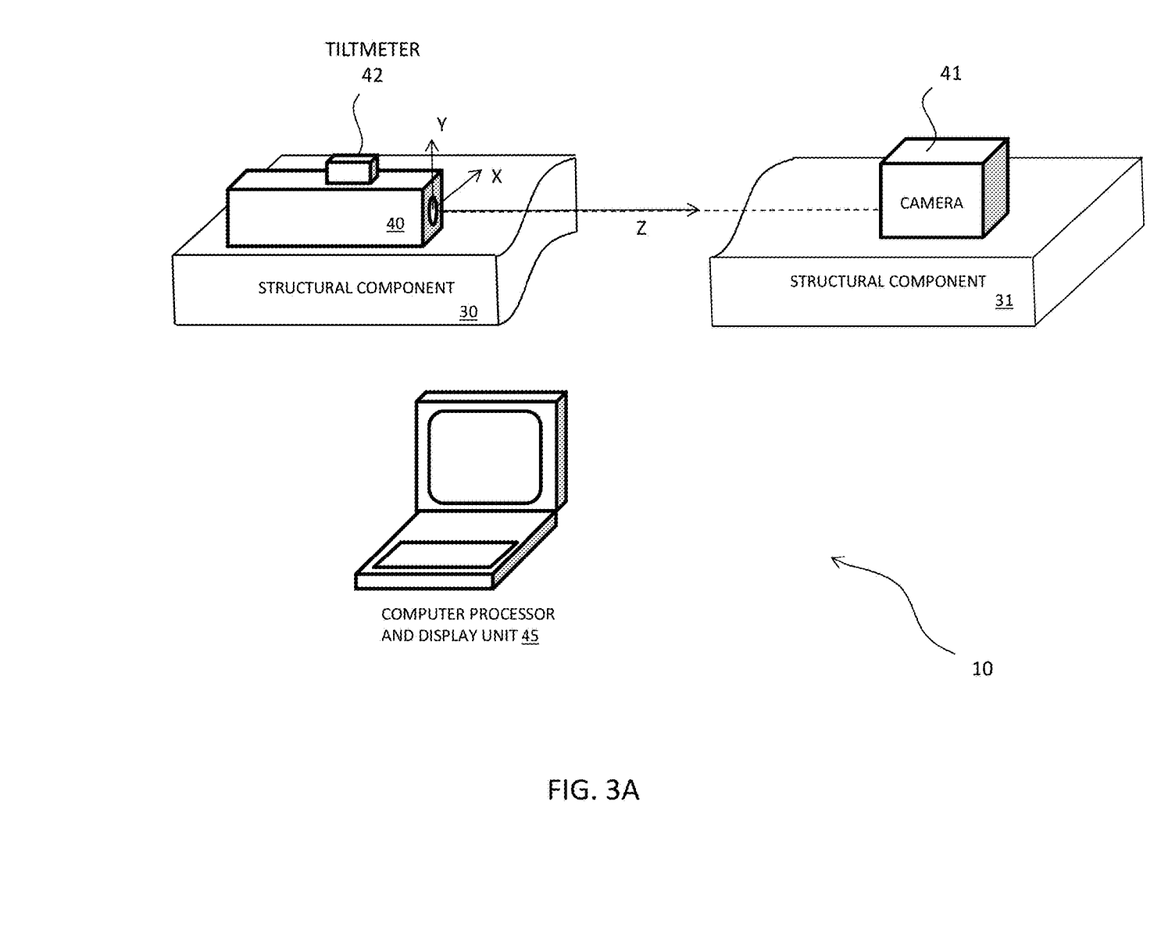
FIG. 3A shows a tiltmeter-integrated two-element relative alignment contact sensor and monitoring system for measuring relative motion between a first structural component and a second structural component.

FIG. 3A illustrates an example of a tiltmeter-integrated two-element relative alignment, contact sensor, and monitoring system for measuring relative motion between a first structural component 30 and a second structural component 31.

In this example, the first structural component 30 and the second structural component 31 are physically independent from each other. However, the first and second structural components can be directly or indirectly connected with each other.

The projector unit 40 seen in FIG. 3A includes a light source, a coded mask, and lens integrated into a single projector unit 40 with the mask positioned between the light source and the lens. The projector unit 40 is rigidly attached to structural component 31. One or more tiltmeters 42 are also affixed to the projector unit 40. The camera 41 can be, for example, a charge coupled device (CCD) grayscale micro-video camera. Note that tiltmeters can be directly or indirectly attached to the projector unit. For example, the tiltmeter 42 could be affixed to the structural component 30 at a location near the projector unit.

Figure 3B:
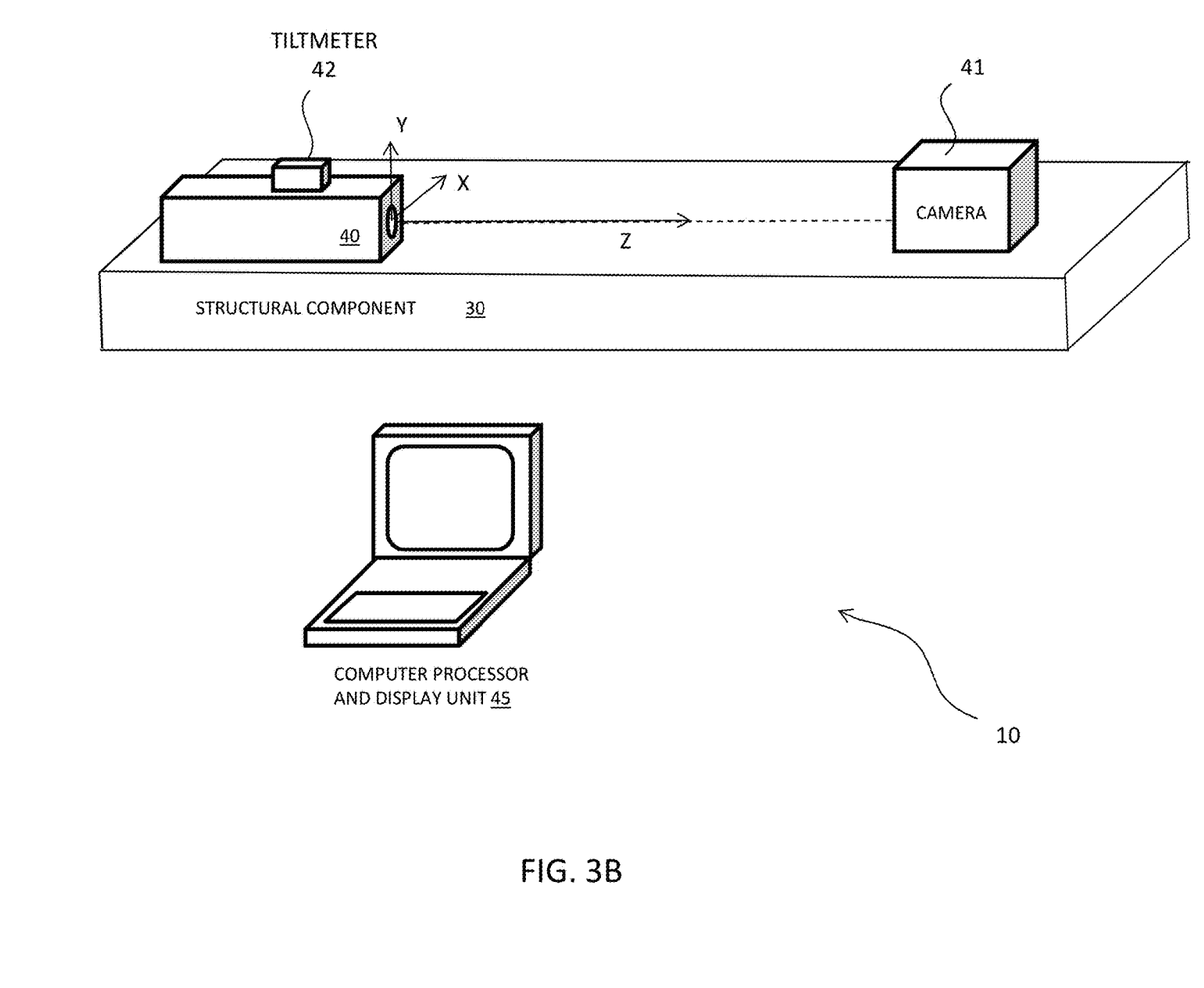
FIG. 3B shows a tiltmeter-integrated two-element relative alignment contact sensor and monitoring system in which the camera, projector unit, and tiltmeters are affixed at different locations on a single structure.

As seen in FIG. 3A, the camera 41 is rigidly attached to a second, physically independent, structural component or object. Alternatively, the camera, projector unit, and tiltmeters can be affixed at different locations on a single structure, to determine changes in position of a first part of the structure with respect to another part of the structure, as seen in FIG. 3B. As one example, long trusses, beams, shafts may bow under their own weight such that the ends of the structure are no longer aligned. Changes in relative position between different parts of a structure, or of two different structures can be the result of loading, fatigue, temperature fluctuation, or other factors. For example, a bridge deck can be deflected out of its original position by vehicle loads and environmental changes.

The asymmetry in the distance between the mask and lens and the lens and camera magnifies the mask pattern, so masks with smaller dimensions are suitable. For example, the smallest squares on the mask can be approximately 20 microns. The diffuse light source illuminates the coded mask, so the mask pattern is projected onto the camera image plane.

The coded mask is a complex pattern imprinted on a thin substrate, such as quartz glass. The mask can be a checkerboard pattern with deviations from the perfect checkerboard grid coded into the pattern. Other alternative masks can be suitable, depending on the expected motion. For example, if only vertical motion is expected, a series of horizontal lines might be suitable. For only rotational motion, a series of bars of different widths extending radially outward from a central point could be suitable. The mask can also include numbers, letters, or symbols.

The tiltmeter can be a single axis tiltmeter, in applications in which tilt in only one plane is expected, or can be a two-axis or three-axis tiltmeter in applications requiring measurement of tilt in more than one dimension. It can also be suitable to use more than one single-axis tiltmeter, each aligned to measure tilt along a different axis. In the tiltmeter-integrated two-element RASNIK system of FIG. 3A or FIG. 3B, the tiltmeter 42 is positioned to measure the tilt away from horizontal z axis in both the x and y directions (rotation about the y and x axes, respectively, by the projector unit 40 and/or the camera 41). One or more tiltmeters can be positioned on the projector unit, the camera unit, or both, depending on which structural element is believed to be likely to experience the most rotational motion.

A computer processor 45 receives and processes the image from the camera and the data from the tiltmeters, and a computer display shows the image and the tiltmeter's tilt measurement. Transmission of the data from the camera and tiltmeters can be made through wireless transmission technology or with electrical or fiber optic cables (not shown).

If either of the structural components 30, 31 moves, there is a corresponding movement of the projected image on the camera, allowing the system to track the relative alignment of the structures 30, 31 to which the elements are attached.

The light source should be bright enough to illuminate the mask pattern clearly at the camera. For many applications, it is preferred that the light source be diffuse. The diffuse light source can be a LED with a diffuser or simply a LED with a low quality casing that serves to diffuse the light. When the distance between the projector unit and the camera is very large, a higher power, coherent light source, such as a laser, can be used to ensure sufficient light reaches the camera.

Figure 4A:
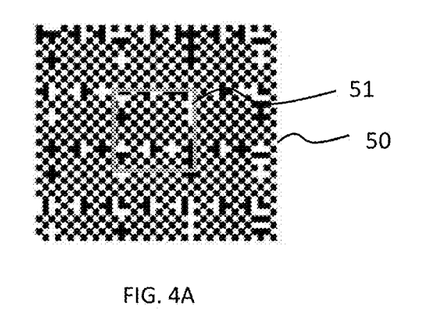
FIGS. 4A, 4B, and 4C show a notional coded mask for use in a tiltmeter-integrated two-element relative alignment contact sensor and monitoring system.
Figure 4B:
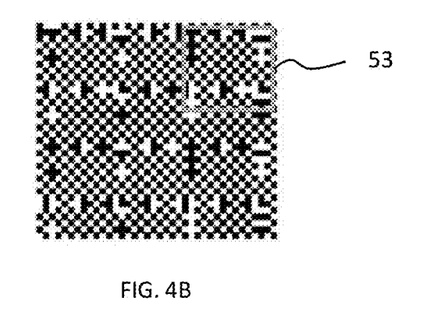
Figure 4C:
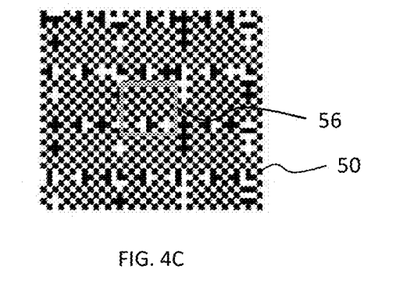

FIGS. 4A, 4B, and 4C show a simple coded mask for the purpose of demonstration. When the diffuse light strikes the mask, the mask pattern will be projected onto the image plane of the camera's sensor.

Figure 5A:
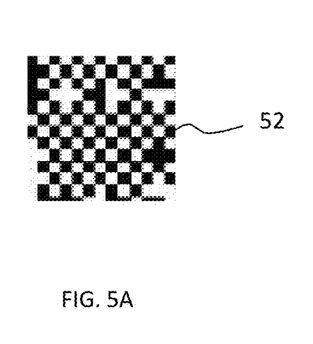
FIG. 5A shows the image of the coded mask pattern of FIG. 4A received at the camera.

In most applications, the distance between the lens and the camera will be much greater than the distance between the lens and the mask, so the projection of the image at the camera's sensor will be larger than the camera's sensor area, and only a portion of the image of the mask will be imaged by the camera's sensor. For example, FIG. 4A shows a coded mask pattern 50 as viewed in a direction from the LED toward the mask and camera. FIG. 5A shows the resulting image 52 received at the camera, as viewed in a direction looking from the LED toward the camera. The square 51 drawn on the mask pattern 50 in FIG. 4A shows the portion of the mask pattern 50 that is projected onto the camera's sensor area. In this example, the projector unit 40 and camera 41 are aligned, so the central area of the mask is projected onto the camera sensor. Note that the image 52 in FIG. 5A has been inverted right-to-left and top-to-bottom by the lens in the projector unit. A computer display shows the image on the display screen. Note that the displacement of the mask image is exaggerated in these images for clarity. For small displacements, e.g. of a few microns, the portion of the mask pattern that reaches the CCD area will be shifted only a few mask elements.

Figure 5B:
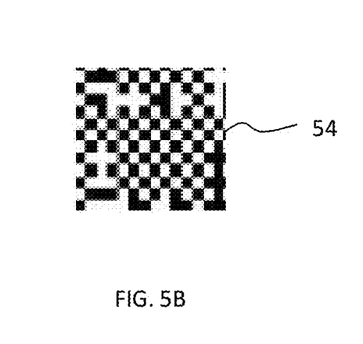
FIG. 5B shows the image of the coded mask pattern of FIG. 4B received at the camera when there has been a relative translation or shift in position of either the projector unit or the camera in an x-y plane.

FIG. 5B shows the image 54 that is received on the camera's sensor when there has been a relative translation or shift in position of either the projector unit 40 or the camera 41 in the x-y plane. The square 53 shown in FIG. 4B shows the portion of the mask pattern 50 that is imaged onto the camera sensor. Note that a different portion of the mask is imaged onto the camera, and that the image is again flipped right-to-left and top-to-bottom. A computer processor receives the image and compares the received image to a reference image, and determines the relative positions of the projector element and the camera element, and thus, of the structural components 30 and 31, the alignment between the structural elements is also determined.

Figure 5C:
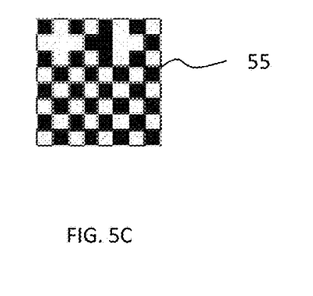
FIG. 5C shows the image that would be received at the camera when there has been a change in distance between the camera and projector units, corresponding to the coded mask pattern of FIG. 5B.

FIG. 5C shows the image 55 that would be received at the camera when there has been a change in distance between the camera and projector units (e.g., an increase or decrease in the distance along the z axis). By comparing FIG. 5C to FIG. 5A, it is seen that that this change in distance causes a magnification of the image of the mask elements. The smaller portion of the mask that is imaged onto the camera sensor is shown by the square 56 on the mask pattern 50 of FIG. 4C.

For each of these images, the computer's RASNIK image processing algorithm can accurately match the received image to the correct portion of the mask, and determine the relative positions of the elements. However, a tilt, or relative rotation of one of the structural elements around the x or y axis can difficult to distinguish from a translation in the x-y plane.

Figure 6A:
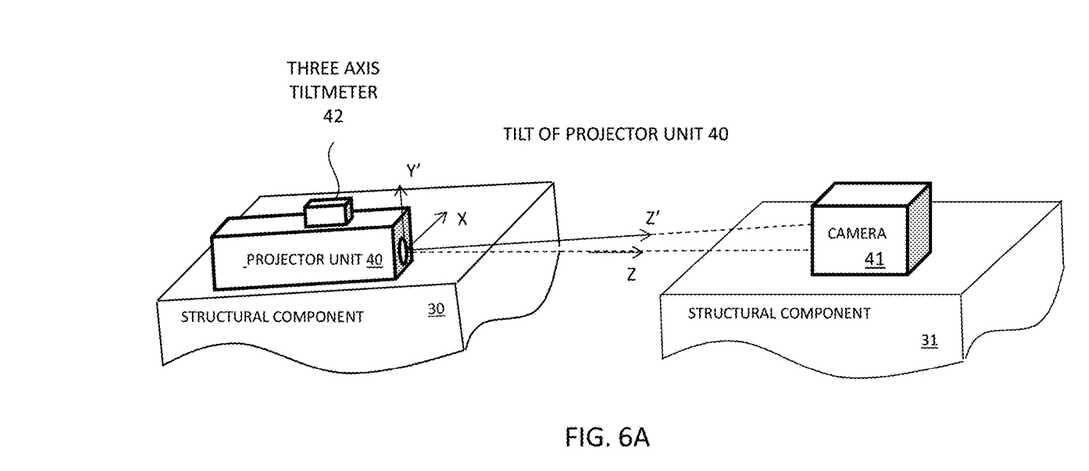
FIGS. 6A and 6B show a system in which one of the structural components has experienced a rotational movement around the x axis with respect to the other structural element.
Figure 6B:
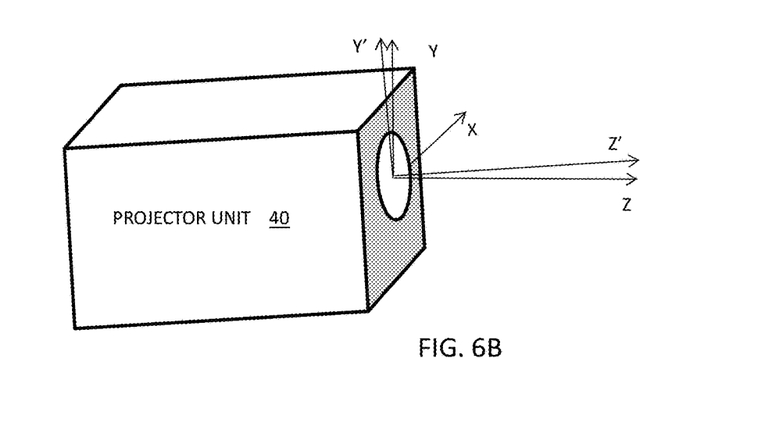

As an example, FIG. 6A shows a system in which one of the structural components has experienced a rotational movement around the x axis with respect to the other structural element. In this example, the structural component 30 has tilted upward (moved in the y-z plane and rotated around the x axis), so the projector unit 40 projects a different part of the mask image onto the image plane of the camera 41. FIG. 6B shows in more detail the tilt experienced by the projector unit 40 when the structural component 30 to which it is attached moves.

Figure 7:
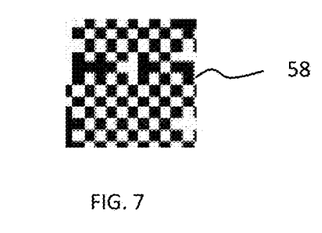
FIG. 7 shows an image of the mask on the camera sensor that results when one of the structural components has experienced an upward tilt.
Figure 8:
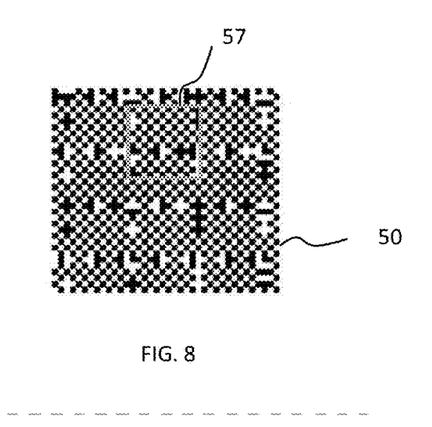
FIG. 8 shows the FIG. 7 image as a part of the coded mask.

FIG. 7 shows the image 58 of the mask 50 on the camera sensor that results when one of the structural components has experienced an upward tilt (rotational movement around the x axis with respect to the other structural element). FIG. 8 shows the portion of the mask that is imaged on the camera sensor, in the area within the drawn square 57. Note that there no way to tell, by simply examining the image, whether the positional shift of the image is caused by an upward translation, or upward shift, of one of the structures (as shown in FIG. 9) or by an upward tilt of that structure (as shown in FIGS. 6A and 6B), because both types of motion produce similar or identical images.

Figure 9:
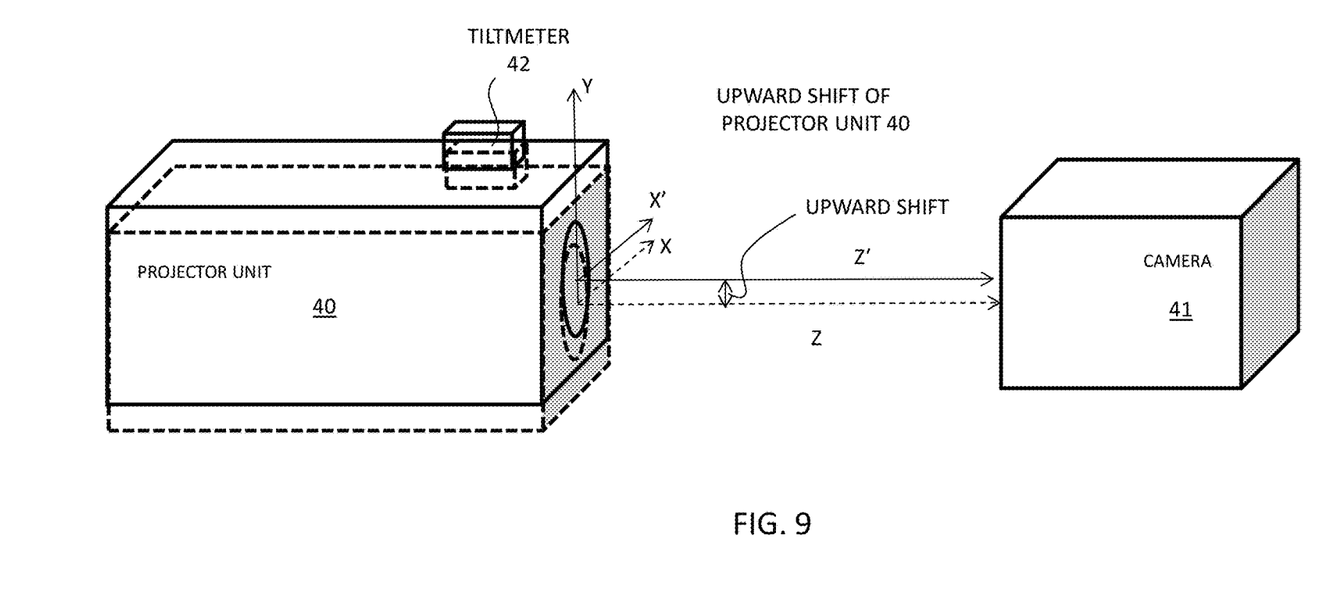
FIG. 9 shows a system in which one of the components has experienced an upward shift.

The upward translation of the structural component 40 is shown in FIG. 9, with the dashed lines representing the original location of the projector unit 40, and the solid lines representing the translated position of the projector unit 40.

It has previously been thought that distinguishing between these different motions would require the RASNIK image analysis software to combine the input from multiple RASNIK systems oriented in different directions, for example, one each RASNIK system aligned along each of an x, y, and z axis. However, the tiltmeter integrated two-element relative alignment monitoring system 10, allows one or more tiltmeters to determine the degree of tilt of the camera, the projector unit, or both. The shift effects of any rotational or tilt motion, as measured by the tiltmeter 42, can be subtracted from the total image shift, so that the translational motion in the x and y directions can be determined.

The output of the tiltmeters can be used in interpreting the RASNIK images in several different ways. The tiltmeter measurements can be output to and inspected on a plotter, digital recorder display, or computer display monitor in real time and the operator can note whether adjustments are needed. In some embodiments, a computer monitor will show both the real time camera image of the mask and the current tiltmeter measurement. Second, the output of the tiltmeters and the measured shifts in the RASNIK image can be recorded on a digital recorder, in a computer storage unit, on a plotter showing past and current measured tilts, and users can subsequently review the data and adjust the image shift information to account for any tilt. Further, the image analysis software can include a module that receives the tiltmeter data and subtracts the rotational effect from the measured shifts in the image of the mask, thus isolating the relative translational motion of the projector unit and the camera.

Thus, addition of the tiltmeter to a two-element RASNIK system allows accurate discrimination between translational motion and rotational motion with a single two-element RASNIK projector unit-camera system, without the need for more RASNIK systems aligned in different directions (e.g., with only a RASNIK system aligned on the z axis, without a RASNIK system aligned along the x or y axes.).

The tiltmeter integrated two-element relative alignment monitoring system can also be used to monitor the movement between and sense contact between different components.

Figure 10:
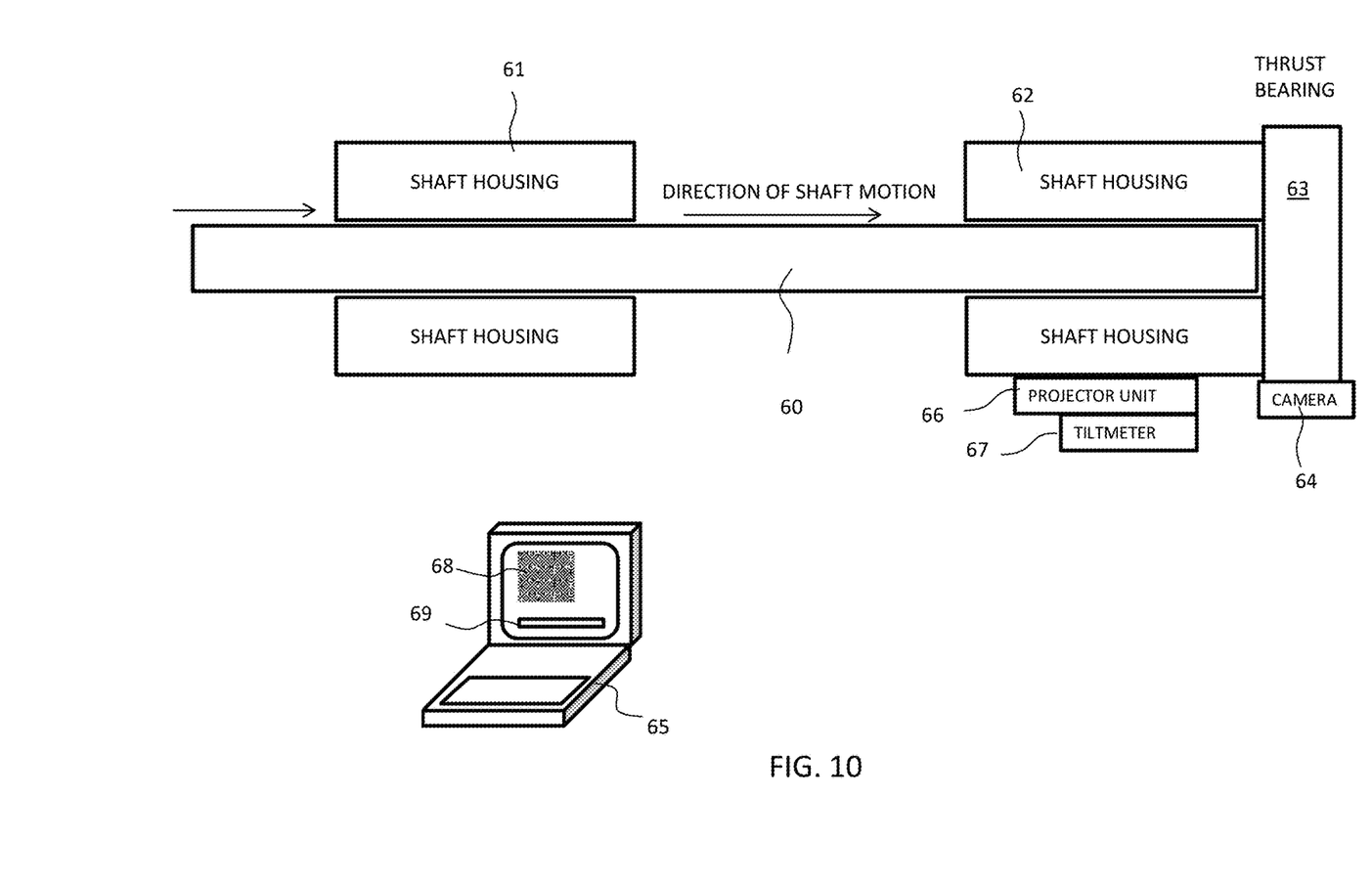
FIG. 10 illustrates a tiltmeter-integrated two-element relative alignment monitoring system as positioned for contact sensing.

FIG. 10 illustrates a tiltmeter-integrated two-element relative alignment monitoring system as positioned in an industrial setting. In this example, the desired operation is to insert a shaft into a space with very little space between the shaft and the surrounding system components. This could be, for example, a step in assembling an automobile drive system in which an automotive drive shaft is inserted into a space defined by housings or bearings, such that the shaft is inserted into the cavity until it contacts a thrust bearing at the far end of the cavity. As another example, the shaft could be a propulsion shaft in a ship, submarine, or other land, water, or air vehicle.

The partially assembled system has at least two pre-positioned shaft housings 61, 62 and a thrust bearing 63 at one end, with an approximately 10 micron clearance between the outer diameter of the shaft 60 and the housings 61, 62. It is desired that the shaft 60 be roughly centered within the housings 61, 62 and that the shaft should come to rest in contact with the thrust bearing 63, such that the shaft presses against the thrust bearing with a desired level of force.

A tiltmeter-integrated two-element relative alignment optical monitoring system is positioned with the projector unit 66 affixed to one of the housings and the camera 64 affixed to the thrust bearing 63. One or more tiltmeters are affixed to the projector unit 66.

In some applications, the tiltmeter can be temporarily affixed to the projector and/or camera, and the projector and camera can be temporarily affixed to the structure with double sided adhesive tape or similar temporary attachment devices. Alternatively, the attachments can be more permanently formed with epoxy or other adhesives, or other chemical or mechanical attachment systems. Assuming a rigid attachment, any movement of the RASNIK camera and projector elements corresponds to the movement of the structural components to which the elements are attached. A degree of flexibility in the attachment between the RASNIK elements and the structural components can be tolerated in some applications.

The computer 65 receives the images from the camera 64 and the data from the tiltmeter 67 (e.g., a degree of tilt in each direction), and the computer display shows both the image of the mask 68 on the camera and the tiltmeter measurement 69.

The shaft is inserted from the left as shown by the arrow in FIG. 10. As the shaft 60 moves through the openings in the housings 61, 62 and toward the thrust bearing 63, a user monitors the camera's image of the RASNIK mask on the computer 65 display. Incidental contact between the shaft 60 and any of the housings will be immediately apparent to the eye as a rapid jolt or jostling type motion of the RASNIK output image on the monitor, with no DC displacement registering on the tilt meter. As the shaft moves, contact between the end of the shaft and the thrust bearing 63 is apparent to the eye as a sudden thunk-type impulse motion of the RASNIK image on the monitor, with no DC displacement registering on the tiltmeter.

Loading of the shaft by the thrust bearing when the end of the shaft contacts the thrust bearing is expected to cause a rotation or bending type distortion of the RASNIK output image on the monitor. A DC displacement will also register on the tiltmeter 67. The magnitude of the displacement of the image and/or the change in tiltmeter reading can also be calibrated with respect to a given loading scenario using auxiliary measurement equipment. Once calibrated, contact, absence of contact, and the specified loading may be discerned by eye at a glance at the display showing the tiltmeter reading and the image of the mask.

Figure 11A:
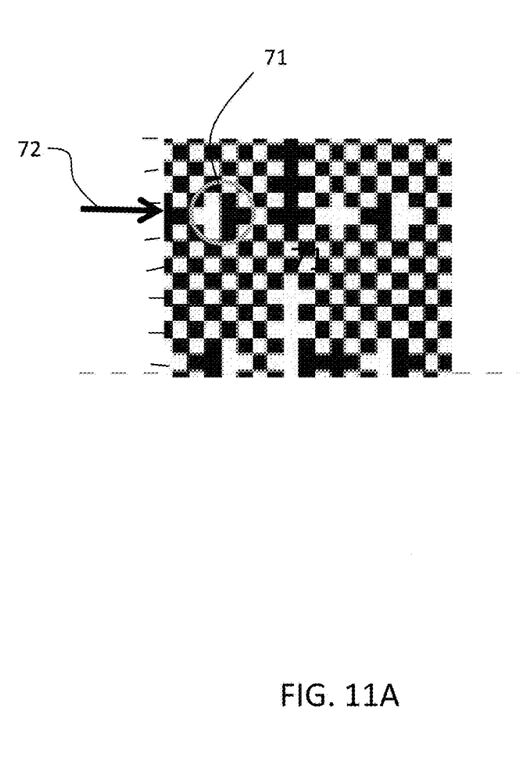
FIGS. 11A and 11B show a computer screen displaying the mask image.
Figure 11B:
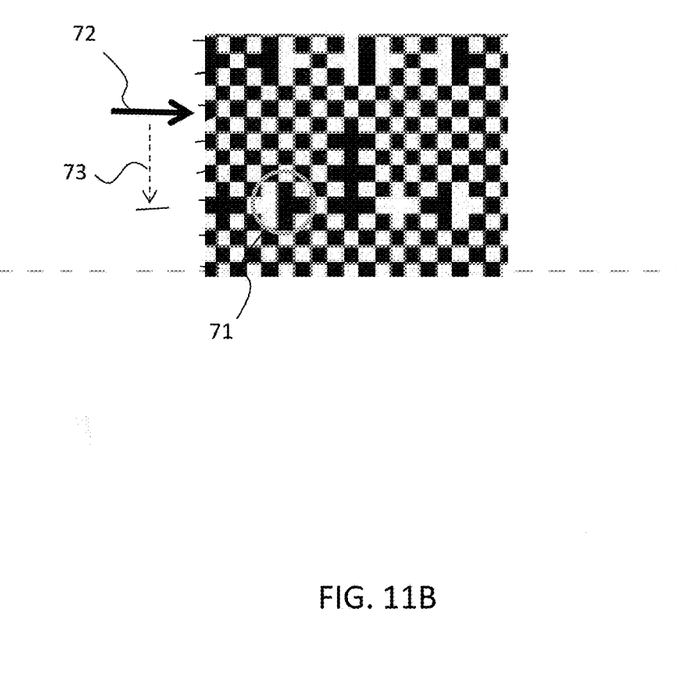

For example, as seen in FIG. 11A, the user can mark the screen with a marker 72 at the location of an identifiable component 71 of the image. Any motion 73 of the identifiable component in the image on the display screen can then be easily seen by visually comparing the new location of the identifiable component 71 with the location of the original marker 72, as seen in FIG. 11B.

Figure 12:
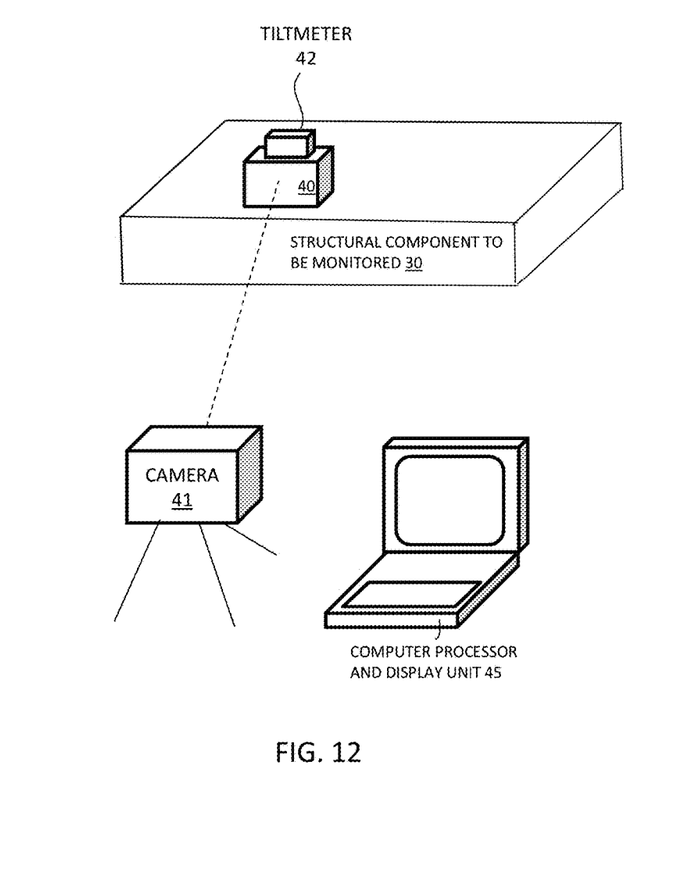
FIG. 12 shows a tiltmeter-integrated two-element relative alignment monitoring system in which the projector or the camera is mounted to a structure away from the system to be monitored.

In other embodiments, the camera could be positioned on a structure external to the component to be monitored. For example, in FIG. 12, the camera 41 is positioned away from the structural component 30 that has the projector 40 and tiltmeter 42. As in the other examples, both the tiltmeter data and the camera's received RASNIK image are transmitted to and displayed on the computer 45 for the user.

The term RASNIK as used herein is an acronym for Relative Alignment System of NIKHEF (National Institute for Subatomic Physics). As used herein, RASNIK refers to any alignment system using a camera to determine positions of components based on a change in the image of a projected mask pattern on the camera sensor.

Portions of the system operate in a computing operating environment, for example, a desktop computer, a laptop computer, a mobile computer, a server computer, and the like, in which embodiments of the invention may be practiced.

A brief, general description of a suitable computing environment in which embodiments of the invention may be implemented follows. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer.

According to one embodiment, the tiltmeter-integrated two element relative alignment monitoring system may include a number of program modules. According to various embodiments of the invention, the computer may operate in a networked environment using logical connections to remote computers through a network, such as a local network, the internet, etc., for example. The computer may connect to the network through a network interface unit connected to the bus. It should be appreciated that the network interface unit may also be utilized to connect to other types of networks and remote computing systems. The computer may also include an input/output controller for receiving and processing input from a number of other devices, including a keyboard, mouse, etc. (not shown). Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

What is claimed as new and desired to be protected by Letters Patent of the United States is:

1. A method for monitoring motion of a moving structure with respect to a stationary structure, the method comprising:

providing a projector unit rigidly mounted to a first component of the stationary structure, a camera rigidly mounted to a second component of the stationary structure, and a tiltmeter affixed to the camera or the projector unit, the projector unit having a diffuse light source, lens, and a coded mask having a pattern, the coded mask positioned between the diffuse light source and the lens;

illuminating the coded mask with the diffuse light source, such that the lens magnifies an image of the pattern of the coded mask and focuses the image onto an image plane of the camera;

measuring, with the tiltmeter, an amount of tilt of the projector or camera with respect to a reference line between the projector and the camera; and moving the moving structure with respect to the stationary structure while visually monitoring both the sequence of focused images of the coded mask and an amount of tilt measured by the tiltmeter.

2. The method according to claim 1, further comprising:

receiving, with a computer processor, the sequence of images of the mask from the camera and the amount of tilt measured by the tiltmeter;

displaying, on a computer monitor operatively coupled to the computer processor, the sequence of images and the amount of tilt measured by the tiltmeter.

3. The method according to claim 1, further comprising:

ceasing moving the moving structure when displacement of the image or a tiltmeter reading reaches a predetermined value.

4. The method according to claim 1, wherein the moving structure is a propulsion shaft, the stationary structure is machinery, and said moving comprises moving the propulsion shaft into an intended position within a cavity in the machinery.

* * * * *